Patented July 24, 1951

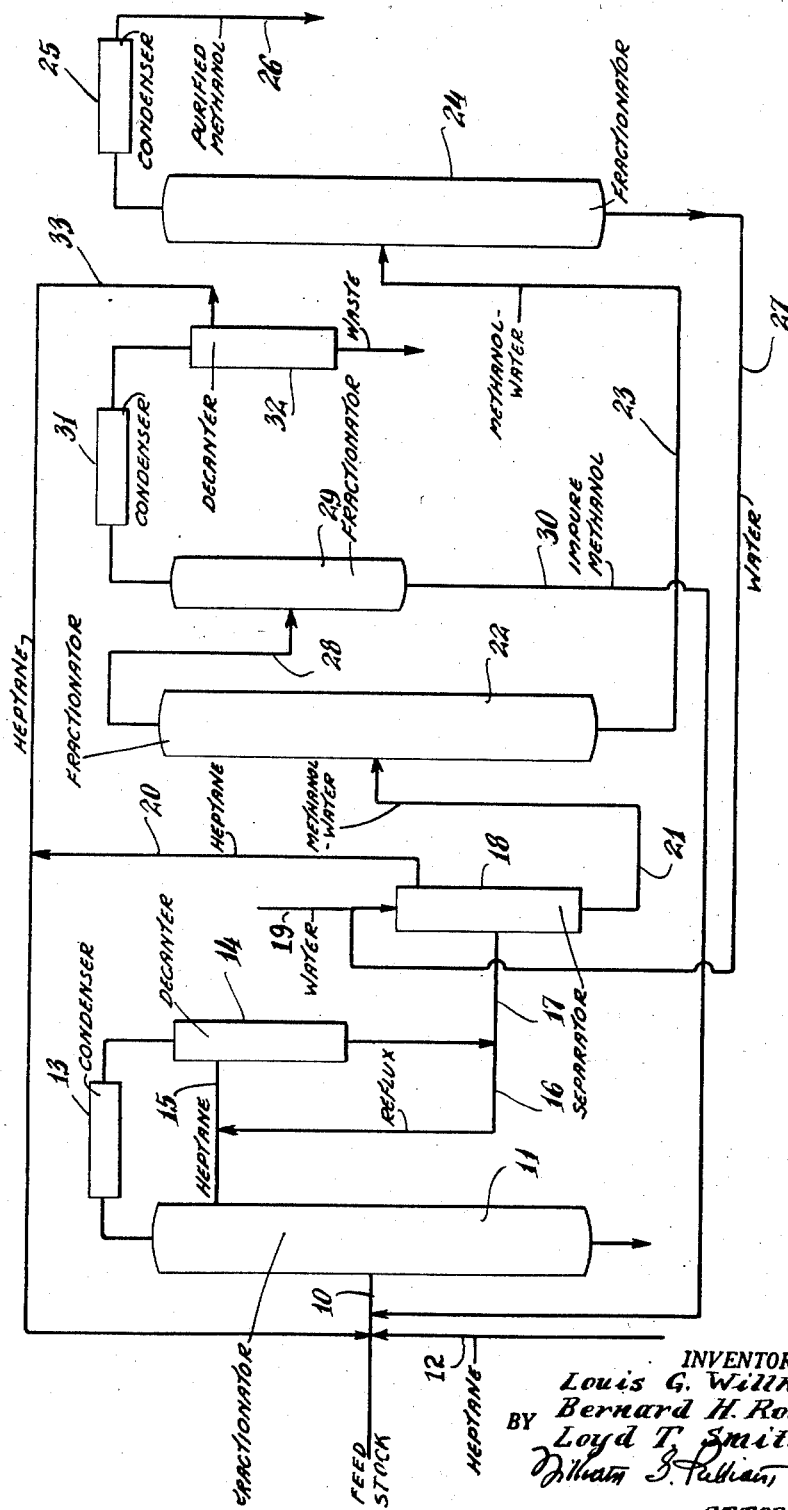

2,561,680

UNITED STATES PATENT OFFICE 2,561,680

PURIFICATION OF METHANOL BY AZEOTROPIC DISTILLATION

Louis G. Willke, Barnsdall, Okla., Bernard H. Rosen, Chicago Heights, Ill., and Loyd T. Smith, Pawhuska, Okla., assignors to Cities Service Oil Company, Bartlesville, Okla., a corporation of Delaware Application July 20, 1949, Serial No. 105,854

4 Claims. (Cl. 202—42)

This invention relates to the refining of low-boiling alcohols, and is directed especially to the treatment of crude methanol containing small amounts of impurities of a character such that they cannot practically be separated from the principal product by fractional distillation. As such, it is particularly applicable to the purification of lower alcohols produced by the partial oxidation of normally gaseous aliphatic hydrocarbon fractions.

Such alcohols invariably are contaminated with color and odor bodies, which, while present in very small quantities, render the products unusable for most commercial purposes. Even the most efficient fractionation possible to obtain in commercial practice will not remove these impurities.

An object of this invention is to provide a new and practical method for treating crude methanol to produce a refined product substantially uncontaminated by odoriferous and color-imparting impurities.

Our process is an improvement on the process disclosed by Lembcke in U. S. Patent No. 2,351,527, in which a crude methanol is azeotropically distilled with heptane, the heptane-methanol azeotrope is broken in a separator by the addition of water, and the aqueous layer from the separator is subjected to further distillation to recover substantially purified methanol.

The improvement consists in major part in subjecting the aqueous layer from the Lembcke separator to a first fractional distillation to take overhead from 10 per cent to about 30 volume per cent of the methanol content of the product, subjecting the overhead product to a second fractional distillation to take overhead dissolved heptane and a small percentage of methanol, recycling the bottoms from the second fractional distillation to the azeotropic distillation step, and fractionating the bottoms from the first fractional distillation to recover methanol of much greater purity than that obtainable in the Lembcke process. Other features of our improvement make it possible to put the process on a continuous basis, as opposed to the batch basis of Lembcke, with a recovery of 98 per cent or more of the methanol charged to the process as CP methanol.

The new process will be hereinafter described with reference to the accompanying drawing which is a diagrammatic flow sheet of our process.

The feed stock may consist of any crude methanol containing aldehydic and unsaturated impurities of a nature such that they cannot be removed by fractional distillation. For the purposes of the following description, the feed stock will be considered the 63°–99° C. fraction produced by the partial oxidation of normally gaseous hydrocarbons according to the process disclosed in the Walker Patent No. 2,007,115. This fraction is preferably subjected to a treatment with caustic soda to effect a partial purification prior to being introduced to our process.

The partially purified alcohols are led through line 10 to a fractionating column 11 in which they are subjected to fractional distillation in the presence of an azeotropic agent such as heptane. When starting up the process, heptane is introduced into the feed stream to the fractionating tower 11 through line 12 in the desired amount, which may range from 15 per cent to 100 per cent by volume of the alcohol feed stock. However, after the process has been in operation for a sufficient length of time to arrive at an equilibrium, only such amounts of heptane are added through line 12 as may be required to make up the small losses incurred in the normal operation of our process.

The fractionating column 11 is operated to take overhead an azeotrope of heptane and methanol boiling between 55 and 61° C. which is then led to a decanter 14 in which the azeotrope breaks into two layers, the upper layer consisting chiefly of heptane which is returned to the fractionating tower through line 15. The lower layer, consisting chiefly of methanol, is withdrawn from the decanter 14 for further processing, a portion of the methanol product being returned to the fractionating tower 11 through line 16 in such amounts as to provide the desired reflux.

The remainder of the methanol withdrawn from the decanter 14 is led through line 17 to a separator 18 in which water introduced through line 19 is added to effect a further separation of the heptane from the methanol. We have found that generally it is desirable to add from 15 to 50 volume per cent water, based on the methanol content, in order to reduce the percentage of heptane still remaining in the methanol to about 1 per cent, the preferred amount of water being in the vicinity of 22 per cent based on the methanol present. The heptane separated by means of this water treatment will float off as an upper layer, and may be returned to the system through line 20.

It should be noted that water is supplied through line 18 in the full amount required for the treatment only when first placing the process in operation. When the process has been in operation long enough to reach an equilibrium, the water required is obtained by recycle from another stage of the process, as will be hereinafter pointed out.

The methanol-water solution is withdrawn from the mixer 18 through line 21, and is then led to a fractionating still 22 in which from 10 per cent to about 30 volume per cent of the alcohol content of the feed is taken overhead. The bottoms from still 22 is led through line 23 to a fractionating still 24 where the methanol content is largely separated from the added water, the product being condensed in condenser 25 and then led to storage through line 26. It has been found that by taking about 10 per cent of the alcohol content overhead in tower 22 the methanol recovered from the bottoms will contain 0.2 per cent or less impurities measured as apparent dimethyl acetal, which is pure enough for most commercial uses. However, by taking from about 15 to about 30 per cent of the methanol charge overhead in column 22 we have found that the methanol recovered will contain less than .02 per cent impurities, has a clean methanol odor, and is capable of passing any of the tests for CP methanol.

The bottoms from the fractionating tower 24, which consists essentially of water, but which may contain up to about 7 per cent methanol depending on the fractionating conditions such as reflux rate, etc., is recycled to the system, being led through line 27 to the mixer 18 where it serves to break the heptane-methanol solution recovered from the decanter 14.

The overhead from still 22 containing, as stated above, from 10 to 30 per cent of the methanol charged to still 22, and containing substantially all of the heptane dissolved in the feed to column 22, is conducted through line 28 to a fractionating column 29 in which about 3 to 5 volume per cent of the material, based on the methanol feed to column 22, is taken overhead. The bottoms from this distillation, consisting of methanol having an impurity content roughly equivalent to the impurity content of the feed stock to column 11, is returned to column 11 through line 30 for further processing as described above.

The overhead from column 29 is passed to a condenser 31, and then led to a decanter 32 in which the overhead breaks into two phases, the upper phase consisting essentially of heptane, which may be recycled to the fractionating column 11 through line 33. The lower layer in the decanter 32 consists essentially of highly impure methanol, amounting to about 2 per cent of the original methanol feed to the process. It has been found that this methanol is so highly contaminated that further purification is not economically desirable, so that it is led to waste or other disposal.

It will be apparent from the foregoing that methanol of substantially any desired degree of purity may be produced according to our new process merely by varying the percentage of feed taken overhead in column 22 and that means are provided for recycling impure methanol streams to the process so that losses in the operation are held to a minimum. Our process is thus adaptable to produce methanol of CP grade from highly contaminated feed stocks, or lower grades of methanol may be produced at lesser cost for use as antifreeze and the like. It should be particularly noted that our process provides an extremely economical method for producing a CP grade methanol, since the only cost over that required to produce an anti-freeze grade is the cost of the heat necessary to vaporize approximately 20 per cent of the feed in column 22 and the heat necessary to vaporize the recycled methanol in column 11.

Having now described our invention, what we claim as new and useful is:

1. The process of refining crude methanol including fractionally distilling the crude in the presence of a hydrocarbon consisting essentially of heptane to distill overhead substantially all of the methanol as an azeotrope distillate, adding water to the distillate, allowing the mixture to separate by gravity into a top layer of heptane and a bottom aqueous methanol layer, returning heptane from the separated top layer to the distillate zone for use in continuing the azeotropic separation of methanol from the crude, fractionally distilling the aqueous methanol layer to take overhead from about 10 to about 30 per cent of the methanol, fractionally distilling the overhead from the latter distillation to take overhead from about 3 to about 5 per cent of the methanol based on the original methanol charge to the system, and returning the bottoms product from the last fractional distillation to the azeotropic distillation zone.

2. The process of refining methanol including subjecting a crude methanol containing close-boiling impurities to a first fractional distillation in the presence of heptane to take overhead substantially all of the methanol as an azeotropic distillate, treating the distillate with water, allowing the mixture to separate by gravity into a top layer of heptane and a bottom aqueous alcohol layer, subjecting the aqueous methanol layer to a second fractional distillation to take overhead from about 10 per cent to about 30 per cent of the methanol, subjecting the overhead product from the second fractional distillation to a fractional distillation to take overhead from about 3 to about 5 per cent of the methanol charged to the system, returning the bottoms product from the latter distillation to the azeotropic distillation zone, subjecting the bottoms product from the second fractional distillation to a third fractional distillation to recover as an overhead product substantially purified methanol, and returning the bottoms product from the third fractional distillation to the process in the water-treating step.

3. The process of refining methanol including subjecting a crude methanol containing close-boiling impurities to a first fractional distillation in the presence of heptane to take overhead substantially all of the methanol as an azeotropic distillate, condensing the overhead product, allowing the condensed overhead product to separate by gravity into an upper layer consisting chiefly of heptane and a lower layer consisting chiefly of methanol, returning heptane from the separated upper layer to the azeotropic distillation zone, treating the separated lower layer with water whereby to separate heptane dissolved in the lower layer, allowing the mixture to separate by gravity into a top layer of heptane and a bottom aqueous methanol layer, returning the separated heptane to the azeotropic distillation zone, subjecting the aqueous methanol layer to a second fractional distillation to take overhead from about 10 per cent to about 30 volume per cent of the methanol, subjecting the overhead product from the second fractional distillation to a third fractional distillation to take overhead from about 3 to about 5 per cent of material based on the methanol charged to the system, returning the bottoms product from the third distillation to the azeotropic distillation zone, subjecting the bottoms product from the second fractional distillation to a fourth fractional distillation to recover as an overhead product substantially purified methanol, recovering as a bottoms product a weak aqueous solution of methanol, and returning the bottoms product from the fourth fractional distillation to the process in the water-treating step.

4. The process according to claim 3 in which the overhead from the third fractional distillation is condensed, allowing the condensate to separate by gravity into an upper heptane layer and a lower methanol layer, and returning the upper heptane layer to the azeotropic distillation zone.

LOUIS G. WILLKE.
BERNARD H. ROSEN.
LOYD T. SMITH.

REFERENCES CITED

The following references are of record in the file of this patent:

UNITED STATES PATENTS

| Number | Name | Date |
| --- | --- | --- |
| 968,478 | Ilges | Aug. 23, 1910 |
| 1,912,010 | Ricard et al. | May 30, 1933 |
| 2,080,064 | Roelfsema | May 11, 1937 |
| 2,351,527 | Lembcke | June 13, 1944 |

FOREIGN PATENTS

| Number | Country | Date |
| --- | --- | --- |
| 587,704 | Great Britain | May 2, 1947 |